US012754001B2

(12) United States Patent
Morales Herrera et al.

(10) Patent No.: US 12,754,001 B2
(45) Date of Patent: Oct. 6, 2026

(54) BLASTHOLE STEMMING BASED ON FORMALDEHYDE RESINS, SYSTEM AND CHARGING METHOD

(71) Applicant: OXIQUIM S.A., Santiago (CL)

(72) Inventors: Marcos Antonio Morales Herrera, Santiago (CL); Claudio Humberto Moya Saez, Santiago (CL)

(73) Assignee: Oxiquim S.A., Santiago (CL)

( * ) Notice: Subject to any disclaimer, the term of this patent is extended or adjusted under 35 U.S.C. 154(b) by 0 days.

(21) Appl. No.: 18/868,634

(22) PCT Filed: May 6, 2023

(86) PCT No.: PCT/CL2023/050047
§ 371 (c)(1),
(2) Date: Nov. 22, 2024

(87) PCT Pub. No.: WO2023/235996
PCT Pub. Date: Dec. 14, 2023

(65) Prior Publication Data

US 2025/0354790 A1 Nov. 20, 2025

(30) Foreign Application Priority Data

Jul. 6, 2022 (CL) .................................. 1496-2022

(51) Int. Cl.
*F42D 1/08* (2006.01)
*C08G 8/10* (2006.01)
(Continued)

(52) U.S. Cl.
CPC ................ *F42D 1/08* (2013.01); *C08G 8/10* (2013.01); *C08G 8/24* (2013.01); *C08G 12/38* (2013.01);
(Continued)

(58) Field of Classification Search
CPC ..... F42D 1/08; F42D 1/18; F42D 1/26; E21C 41/00; E21B 7/007
See application file for complete search history.

(56) References Cited

U.S. PATENT DOCUMENTS 6,553,887 B1 4/2003 Bureaux et al.
2011/0259228 A1 10/2011 Mills et al.

FOREIGN PATENT DOCUMENTS

CL 2017001076 8/2017
CN 104406472 3/2015
(Continued)

OTHER PUBLICATIONS

English translation of Search Report issued in PCT/CL2023/050047 (Oct. 4, 2023).
(Continued)

*Primary Examiner* — J. Woodrow Eldred
(74) *Attorney, Agent, or Firm* — Barnes & Thornburg LLP; G. Peter Nichols

(57) ABSTRACT

The invention relates to a method for forming blasthole stemming for mining, which comprises charging a blasthole with a two-component mixture of resin and catalyst, wherein the two-component mixture produces a stiff foam in situ, and once hardened, the two-component mixture is then detonated. The invention also relates to a system for forming blasthole stemming for mining in order to carry out the method; the mixture used as blasthole stemming for mining that comprises the two-component mixture of resin and catalyst, wherein the resins are based on formaldehyde; and to a method for charging and detonating a mining blasthole by using the two-component mixture.

15 Claims, 3 Drawing Sheets
(3 of 3 Drawing Sheet(s) Filed in Color)

(51) Int. Cl.

| | |
|---|---|
| ***C08G 8/24*** | (2006.01) |
| ***C08G 12/38*** | (2006.01) |
| ***C08J 9/02*** | (2006.01) |
| ***E21C 41/26*** | (2006.01) |
| ***F42D 1/18*** | (2006.01) |
| ***F42D 1/26*** | (2006.01) |

(52) U.S. Cl.

CPC ................. *C08J 9/02* (2013.01); *E21C 41/26* (2013.01); *F42D 1/18* (2013.01); *F42D 1/26* (2013.01); *C08G 2110/0025* (2021.01); *C08G 2110/005* (2021.01); *C08J 2201/022* (2013.01); *C08J 2205/10* (2013.01); *C08J 2361/10* (2013.01); *C08J 2361/12* (2013.01); *C08J 2361/30* (2013.01)

(56) References Cited

FOREIGN PATENT DOCUMENTS

| | | | |
|---|---|---|---|
| CN | 104448189 | | 3/2015 |
| CN | 105838025 | | 8/2016 |
| CN | 106832762 | | 6/2017 |
| CN | 107556514 | | 1/2018 |
| CN | 108341919 | | 7/2018 |
| CN | 109280150 | | 1/2019 |
| DE | 2139024 | | 2/1973 |
| EP | 3132205 | | 10/2019 |
| ES | 8800739 | | 11/1987 |
| FR | 2248296 | | 5/1975 |
| GB | 342644 | | 2/1931 |
| JP | S57-37700 | | 3/1982 |
| NL | 6901503 | | 8/1969 |
| RU | 2462688 | | 9/2012 |
| RU | 2753652 | | 8/2021 |
| WO | WO86/00660 | * | 1/1986 |
| WO | 95/14208 | | 5/1995 |
| WO | 99/32534 | | 7/1999 |
| WO | 00/42377 | | 7/2000 |
| WO | 2014/170894 | | 10/2014 |
| WO | 2014/201514 | | 12/2014 |
| WO | 2018/102858 | | 6/2018 |

OTHER PUBLICATIONS

Katanov et al., "Increasing safety at rock preparation by blasting in open pits," E3S Web of Conferences 134, 01017 (2019) https://doi.org/10.1051/e3sconf/201913401017.

* cited by examiner

BLASTHOLE STEMMING BASED ON FORMALDEHYDE RESINS, SYSTEM AND CHARGING METHOD

This application is a U.S. National Stage Application under 35 U.S.C. § 371 of International Patent Application No. PCT/CL2023/050047, filed Jun. 5, 2023, which claims priority to Chile Patent Application No. 1496-2022, filed Jul. 7, 2022, the entire contents of both are incorporated herein by reference.

FIELD OF THE INVENTION

The present invention relates to a method and a system for forming plugs for plugging blast hole voids, by in-situ formation of rigid foam blocks produced from bicomponent mixtures of resins with catalysts, where the resins are formaldehyde-based such as phenol-formaldehyde (PF) resins, urea-formaldehyde (UF) resins, melamine-formaldehyde (MF) resins, melamine urea formaldehyde (MUF) resins, phenol resorcinol-formaldehyde resins (PRF), modified formaldehyde-based resins with lignin or tannins, and their derivatives.

BACKGROUND TO THE INVENTION

In the mining industry, blasting is a very important part of extractive activities as its results have an impact on the economic and operational costs of the post-extraction stages.

Blasting is the operation that aims to extract the ore from the rock mass, making the best possible use of the energy released by the explosive placed in the blast holes made during the drilling and blasting stages. During the blasting process, it is of special interest to maximize rock fragmentation and its respective logistical effects, economic effects and energy saving in subsequent operational processes, such as grinding the material and minimizing the negative effects. In order to achieve maximum fragmentation, it is necessary to manage different variables in the production process, such as the type of explosive, explosive density, charge factor, mesh design, and/or frequency of detonations, among other variables. The blasting process produces a high noise emission and particulate matter, which can affect nearby communities and workers involved in their operations. If the noise and particulate matter limits established in environmental regulations are exceeded, mining companies face serious environmental sanctions.

Blast holes present in a sector area to be blasted can have different depths, generally up to 30 meters (in the open pit) and diameters that can reach an average of 45.72 centimeters (18 inches) depending on the design of the blasting. The blast holes can have water or mud at the bottom. The blast holes are loaded with the appropriate explosive and then sealed with material to contain the gases released during detonation. This seal is called plug and is commonly constructed with the material left over from drilling the hole (debris or detritus). The process described is carried out in this way due to the ease of construction (manually with shovels or light machinery) and the good availability of the material, which generates a kind of plug due to the weight of the column of the plug, which can be up to half the linear height of the hole. However, this design is inefficient in containing the energy produced by the explosive, which results in noise emission and raising of particulate material.

In order to improve the results in the blasting stage, various technologies have been incorporated related to the development of different types of explosives and their location inside the blast hole, as well as engineering and design of accessories and devices that act as a plug for blast holes, which are intended to confine explosive charges in order to take advantage of the release of energy in the fragmentation and displacement of the rock, allowing for greater efficiency at the time of blasting, and thus maximizing the fragmentation of the rock at the time of blasting. In this way, it is intented to achieve beneficial effects in terms of logistics and energy savings in the operation after blasting.

DESCRIPTION OF THE INVENTION

The present invention is directed to a bi-component mixture or composition comprising catalysts and formaldehyde-based resins, a method and system for forming blast hole plugs and the use of the composition to carry out the plug-forming method, improving the results of the technology that is currently known and used.

The stages for carrying out blasting begin with the drilling of the holes, and depending on the type of mineral and the area or sector of the mine, the diameter and depth of the holes will vary. The dimensions of the holes can vary from 5 to 20 meters deep by 15 to 80 cm in diameter. Depending on the depth of the hole, there is a possibility of water or mud.

Conventionally, in the open-pit blasting process, once the hole is configured, detonators are installed at the bottom of each hole and loaded with explosive. A plug or cutting (separation) is added over the explosive, which corresponds to a filling of drill cutting (detritus) that can be in the order of 2 to 4 meters high and whose purpose is to improve the fragmentation indexes. This filling can be done manually with workers and a shovel or with a dump truck that fills each hole with drill cutting. Finally, the detonation stage is carried out, which is generally done through an electronic system.

In mining operations, between 20 and 50 holes are usually built in the pre-splitting area associated with breaking the wall, and between 30 and 150 holes are built in the production holes areas (bank) associated with breaking up all the mineral to be processed in the mine.

The objective of constructing pre-splitting holes is to minimize pressures in the holes in order to generate cracks between adjacent holes of the pre-cut line and thus also reduce pressures in production holes. This is one of the reasons why the noise at the time of blasting is much greater in pre-splitting holes than in production holes.

In a blasting process, the time for filling with explosives and drill cutting in conventional holes can range from 3 to 10 minutes per hole, therefore the process in a task can range from 1 hour (minimum number of holes 20×minimum time 3 minutes) to 25 hours (maximum number of holes 150× maximum time 10 minutes) depending on the number of holes.

In the present invention, once the detonator is installed and the explosive is placed, drill cutting (by way of separation) is added in a minimum quantity that does not exceed 50 cm in height and after this drill cutting, the resin of the invention is added to form the blasting plug. The drill cutting inserted into the hole has the purpose of preventing the contact of the resin of the plug of the present invention with the explosive.

The invention of the present application provides for the formation of a blasting plug, in a very efficient and rapid manner, and has the advantage of reducing the filling time of the blast holes, which does not exceed 1 minute for each hole. Obviously, this stage will depend on the volume and size of the hole to be filled. Therefore, in a normal operation the filling time would not exceed 2.5 hours considering an operation with a maximum of 150 holes compared to 25 hours of work in the case of conventional holes. Depending on the depth of the blast hole, there may be water or mud, which does not affect the efficiency of the formation of the plug of the present invention.

In the present invention, the plug is produced in situ, by the chemical reaction of formaldehyde-based resins with a catalyst to which an expansion agent is optionally added. The resin and catalyst mixture can be applied on aqueous or muddy surfaces, depending on the depth of the blast hole, without affecting the properties of the formed plug. The detonation plug produced in situ allows the energy of the explosion to be contained and maximized its transfer to the rock obtaining greater fragmentation of it, while reducing unwanted environmental effects of noise and particulate matter emissions, which could affect the workers at the site and the communities surrounding the mining operation.

On the other hand, chemical reactions with resins that form rigid foams are generally highly exothermic, which makes it difficult to use in mining operations, as they cannot be used in these operations since detonation wires have a maximum temperature specification generally associated with temperatures not exceeding 55-60° Celsius. Therefore, the exothermic reaction of rigid foam generation cannot exceed 50° Celsius as a safety range, so as not to interfere with the correct detonation of the explosives. If the wires are damaged, due to excessive temperature or another effect of the reaction, the serious problem of a misfire (failure of detonate) occurs with the consequent operational damage and need to search for misfired explosives that constitute a danger, since the explosives must not remain in those places where they did not detonate, and must be removed from the site, which involves additional and excessive operational costs.

Additionally, good practice manuals for reactive soils recommend using explosives in soils with temperatures no higher than 55° C., to avoid reactions between oxidizing substances such as ammonium nitrate present in explosives and iron-based reactive materials present in soils.

The formation of plugs carried out in situ with the formaldehyde resins of the present invention produces a low-energy exothermic reaction, which represents advantages in the mining operation.

STATE OF THE ART

Open-pit mining uses drill cutting plugs, material obtained from drilling, which is readily available and very easy to manipulate. This plug seals the hole, but generates low gas retention since it does not have internal cohesion, ending up ejecting a large part of the drill cutting through the collar of the hole (opening on the surface). In this way, the pressure of the gases released by the detonation cannot be efficiently used, and consequently, the fragmentation of the rock is not optimal, also producing undesirable environmental effects such as a large emission of particulate matter that affects both the workers at the mine itself, as well as the populations surrounding the mining areas. In addition to the above, the high environmental impact caused by noise is very common, both at the site itself and in nearby communities.

To solve these problems, different systems have been designed to contain blasting gases.

For example, the Stempac® plug (Dyno Nobel) is inserted into the blast hole using an insertion tool. It is a device composed of a lining filled with aggregates, which is compressed with an insertion tool so that its position is maintained in the blast hole.

Document WO2018/102858 discloses a stemming plug or retaining plug for stemming a blast hole, comprising a device formed by two elongated wedge-shaped elements manufactured from a plastic material, which is positioned inside the hole, so that at the time of detonation both wedge-shaped elements exert diametrically opposed forces, against the wall of the blast hole to lock the plug in place.

Another example of a retaining plug for blast holes is disclosed in document CL201701076, which comprises a separation disk and a weight, which is integrated into the separation disk located inside a blast hole. The separation disc allows to keep the separation between the explosive and the loading plug or aggregate, gravel or debris plug in order to seal the blast hole.

These types of mechanical devices, are generally manufactured based on high hardness polymeric materials, have appropriate shapes for the reflection and refraction of the shock wave produced by the detonation, but are not very efficient because they are difficult to install correctly and the pressure of the gases often ends up ejecting or breaking them.

Another technology that has been developed relates to the formation of cementitious compositions to form blast hole plugs, with the aim of avoiding energy dissipation produced by the explosion.

For example, US2011259228 describes a cementitious composition containing calcium oxide, calcium hydroxide. Portland cement and/or a high alumina cement, which may also contain calcium sulfate, reactive silica, a suspending agent and a retarding agent. This type of cementitious products generates plugs (or blocks) of good cohesion and high hardness with good gas retention. However, the use of these materials in a blasting area is not viable, since it requires a large amount of material and heavy machinery for the formation of the product, which is not viable from a logistical point of view in the mining operation, due to the time it takes to transport a large amount of material to the blasting area.

Another technology used to form plugs, or drilling plugs, consists of a system of containers that include different constituents and that can form a plug in situ. For example, document WO9514208 discloses a device comprising two bags arranged one inside the other and in turn, both are located inside a container, which is located near a blast hole, and the inner bag comprises an isocyanate compound and the other contains a mixture of polyol resin and freon. When the inner bag breaks, it allows the isocyanate to react with the polyol resin and freon of the outer bag, forming a rigid foam, contained in the outer container, which becomes the foam plug in the drilling hole. On the other hand, document ES8800739 presents a similar mechanism for forming a perforation plug that forms a platform at a desired level to support explosives that allows the formation of foams when polymerized methylene diisocyanate is mixed with polyol.

Another example that meets the condition of forming a rigid foam plug in situ in a blast hole is described in document CN108341919, which discloses the formation of a foam constituted by reacting two polymeric components (polyisocyanate and polyether polyol) and the addition of expandable graphite and a foaming agent, to fill a blasthole.

Document US6553887 also discloses foam formulations that have the capacity to contain and suppress explosions, in order to repress both the blast wave and the aerosols containing chemical and biological agents resulting from the activation of explosive devices. This document specifically discloses a formulation comprising a surfactant (alkyl ether sulfates, alpha-olefin sulfonates and alkyl sulfosuccinates), a foam stabilizer (long chain fatty alcohol), a polyalkylene glycol (polypropyleneglycol monomethyl ether with a molecular weight of 425) and water.

On the other hand, document NL6901503 discloses the formation of foams using non-polymeric compounds such as anionic, cationic and non-ionic soaps and surface-active substances and saponin and proteins, or inorganic foam forming agents such as colloidal aluminium oxide and aliphatic carboxylic or phosphoric acids or their salts, or sulphonation products of mineral oils and alcohols, and horse-chestnut extracts and document DE213902414 discloses a foam consisting of an anionic synthetic humectant, a fatty alcohol, water, an alcohol-solubilizing adjuvant, a dispersing agent of a film-forming synthetic material, preferably a copolymer of vinyl acetate or vinyl propionate with a dialkyl maleate or ethylene, or an SB copolymer, where the objective is to prevent the formation of dust and ignition in blasting operations.

Another technology related to the technical field of the invention relates to the formation of gels by reacting a chemical agent with the water present in the blast holes, forming plugs or barriers. For example, EP3132205 discloses the formation of a polyacrylamide gel with the water present in the blasthole, useful as a barrier material for loading explosives in blast holes. Another example is RU2753652 which describes a foamed silica gel formed from sodium silicate, “nanosil-30” silica, an ABSC foaming agent, orthophosphoric acid, iron chloride and water. The gel plug formed is useful as a low-density plug in blast holes when crushing rock mass during the extraction of solid minerals.

Furthermore, document WO2014201514 (CL201503656) discloses the formation of a column of a gel of a superabsorbent polymer as a gelled elongated body having at least 25:1 of its own weight in water which allows to increase the efficiency of an explosion by reducing the detonation pressure. In this document, the gel-forming agent is not specifically disclosed, noting that the described embodiments use superabsorbent polymers (SAP) or any similar reagent that has the ability to absorb in an amount equal to or greater than 25:1 its own weight in demineralized water.

Finally, document CL201503059 points to the formation of a potassium polyacrylate gel, useful as a barrier material for the loading of explosives and/or as a detritus plug.

Although these types of technology form rigid foams or water-absorbing gels, which may or may not be generated on site, have the disadvantage of forming inefficient plugs, since the hardness of the product obtained is not sufficient to allow adequate retention of particulate material or the reduction of noise emissions resulting from the blasting operation.

In the state of the art, phenol-formaldehyde, melamine-formaldehyde, and urea-formaldehyde resins are known, which when combined with each other form rigid foams. However, the applications of the products obtained with these resins solve technical problems completely different from those raised in the present invention.

For example, WO9932534 relates to a binder product as an adhesive in the manufacture of wood products, fiberglass products and paper laminates, comprising a modified phenol-formaldehyde or melamine-formaldehyde resin, based on resin solids of the cyclic urea prepolymer.

CN107556514 discloses the formation of rigid foams based on melamine formaldehyde, which are used to manufacture modified melamine-formaldehyde foam boards with polytetrahydrofuran for fire-retardant heat insulation.

On the other hand, CN106832762 discloses a preparation method of low-density flame melamine formaldehyde resin rigid foam to be used as thermal insulation materials. The method requires molding and oven drying stages to obtain the rigid foam.

CN104448189 discloses a process for producing hard polyurethane foams modified with phenolic resin useful as thermal insulators and water-resistant, widely used as thermal insulation material in urban heating pipes, petrochemical pipes, refrigeration equipment and air-conditioning in buses. FR2248296 also discloses an insulating material formed from a rigid foam consisting of a thermoplastic styrene polymer and a curable resin based on a melamine/formaldehyde condensate.

These resins have also been used in the manufacture of construction materials, such as document CN105838025 which discloses a method of preparing a modified rigid polyurethane foam (PIR) with melamine formaldehyde resin.

As can be seen from the state of the art, there are various applications of formaldehyde resins, in particular phenol-formaldehyde, melamine-formaldehyde, urea-formaldehyde resins, combined with each other to form rigid foams, however, none of these documents disclose foams with the properties of the present invention, nor do they suggest its application in an area such as mining blasting.

Additionally, in the case of polyurethane-based rigid foams, they have the disadvantage that these materials are toxic, have a high reaction temperature, are incompatible with industrial explosives, and are expensive, making them unviable for use as blasting plugs.

While most of these documents disclose the formation of rigid foams, none of them focus on the mining field to form blast hole plugs in-situ that contain the energy of the explosion and maximize this transfer of energy to the rock, providing greater fragmentation, and in turn reducing the undesirable environmental effects of noise and particulate material emissions.

The density of the rigid foams plays a fundamental role in the results obtained in the present invention, since it has been found that low densities of the rigid foams achieve better effects than rigid polyurethane-based foams that have densities in a greater range.

The advantages of having low densities, reduce the volume of material that must be moved to the mining site, such that the rigid foams of the present invention, which have a density of 0.2-0.3 kg/$m^3$, allow moving about ⅕ of the volume of material necessary to meet the requirements, compared to conventional techniques, which has an advantageous impact on operational and logistical costs. On the other hand, the use of foams of the present invention, with densities in the order of 0.2 to 0.3 kg/$m^3$, have shown greater dissipation of the sound wave, therefore a decrease in decibels as well as a decrease in dust emission during blasting.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
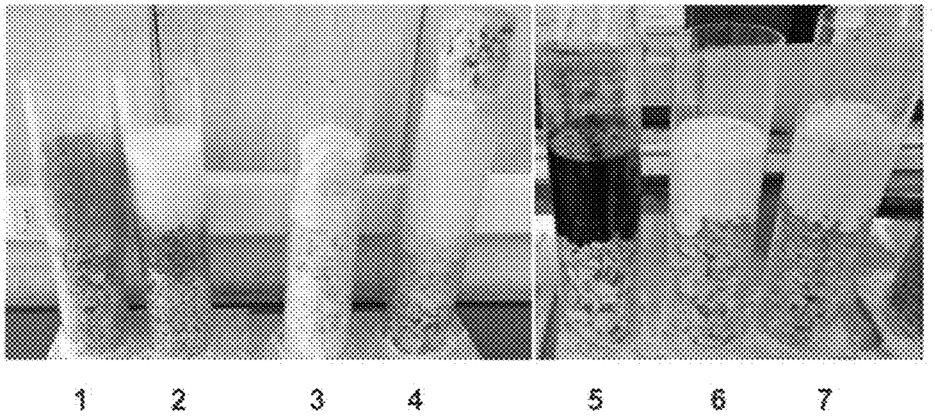
FIG. 1: shows photographs of the experimental laboratory results of the bi-component mixture of resin/catalyst, where the following resins were tested in polycarbonate tubes: (1) PHENOLIC Resin: PF phenol formaldehyde, in molar ratio 1.6; (2) PUR: Polyurethane Resin; (3) pMDI: Polymethyldiisocyanate (Durapro®); (4) pMDI-LS: Low reactivity polymethyl diisocyanate (Durapro®); (5): PRF: Formaldehyde Resin/(Resorcinol+Phenol) in a molar ratio of 0.8 to 1.0; (6) MUF-1: Formaldehyde Resin/(Melanin+Urea) in a molar ratio of 1.2 to 1.8 (low viscosity); (7) MUF-2: Formaldehyde Resin/(Melanin+Urea) in a molar ratio of 1.2 to 1.8 (high viscosity).

The present invention corresponds to a method of producing plugs made of rigid polymeric materials in blastholes previously loaded with explosive, where these plugs are produced in situ, through the chemical reaction of formaldehyde-based resins, a catalytic agent and additives that confer different properties of density, hardness, pH, etc. to the material to be used. The resins are of the phenol-formaldehyde (PF), phenol-resorcinol-formaldehyde (PRF), melamine-urea-formaldehyde (MUF) and/or lignin-formaldehyde type.

The technical problem, which the present invention solves, has been addressed in different ways in the state of the art. However, the solution proposed in the present invention, related to a method for forming plugs in situ from formaldehyde-based resins, is not disclosed in the prior art.

The method for in situ formation consists of filling the blast hole to a certain height with the reactive agents, the reaction taking place at the time of mixing, which gives the advantage that this method requires a very short time for the formation of the plug. The in-situ formed plug allows the energy of the explosion to be contained and the transfer of this energy to the rock to be maximized, which results in greater fragmentation of the rock, considerably reducing the operational costs of the production stages after extraction. Additionally, the plugs obtained by the method of the invention have the additional advantage of reducing the undesirable environmental effects of noise and particulate material emissions, which could affect the workers at the site and the communities surrounding the mining operation.

The system that enables the method of applying rigid foam-forming agents consists of a mixer-applicator capable of handling highly corrosive substances and mixing the reagents homogeneously, in the necessary and optimal concentrations to form the materials that will serve as blasting plugs.

The method of constructing the blasting plugs obtained by means of the present invention, using polymeric materials derived from formaldehyde and phenolic compounds, has surprisingly allowed to increase the fragmentation of the rock by at least 25%, to decrease the reduction of air pressure in the monitoring systems, and to decrease the decibels of the detonation and particulate material by at least 50%, compared to the methods normally used in said mining operations.

It is known that phenol-formaldehyde based resins can be produced in such a way that their setting temperature and time (hardening process) are determined by the different physicochemical parameters that characterize it, such as the amount of total solids, pH, the molar ratio between formalin/phenol and/or urea, melamine, resorcinol, the size of the polymer and alkalinity. If this resin is mixed with additives capable of generating a gas during the setting process, a highly porous material (foam) can be obtained, which can present different characteristics of elasticity, hardness, toughness, and plasticity. These characteristics, besides depending on the internal composition of the resin used, may be a reflection of the quantity and speed of the reaction at the time of setting, which is dictated by the type, concentration and quantity of catalyst added to the reactive mixture.

In addition, other additives can be added to the formaldehyde-based resin, such as foaming agents, surfactants, fillers, buffers, or any other additive compatible with the setting characteristics required for the application. Therefore, by controlling the composition of a formaldehyde-based resin mixed with specific additives, which form a specially designed catalyst, materials with characteristics suitable for use as plugs in mining blast holes are obtained.

The material constituting the blasting plug of the present invention is formed from a bi-component composition or mixture comprising a formaldehyde-based resin and a catalyst suitable for said resin.

The resins used as the material forming the plug are synthesized based on formaldehyde and another co-monomer capable of forming a stable co-polymer with formaldehyde and with characteristics appropriate to the desired use. Such co-monomers may be chosen from (but not limited to) phenol, urea, melamine, resorcinol, etc. Additionally, blocks of semi-polymerized materials such as pMDI (Polymethyldiisocyanate), or any petroleum-based material capable of reacting with formaldehyde, may be used. In addition, renewable materials such as tannins, lignin, or any other lignocellulosic material capable of copolymerizing with formaldehyde can be used.

The copolymers mentioned above can also be used as blends. Formaldehyde-based polymers can be used in different molar ratios, with various sizes and degrees of polymerization, viscosities, pH conditions and total solids content suitable for use as plug material.

The resin compositions mentioned may contain other types of substances that incorporate desired characteristics to the material that will be used as a plug, such as (but not limited to):

- Rheology modifiers that provide particular flow or rheology characteristics, for example, acrylic polymers or prepolymers, urethanes, carbohydrates, lignocellulosic materials, etc.

Surfactants that give the material antifoaming or foaming characteristics.

Buffers or pH regulators suitable for setting of the material; said buffers can be inorganic or organic.

Gasifying agents, such as pentane, hexane, dichloromethane or any other additive that generates gas during the setting reaction of the material to be used as a plug.

Expanding agents such as carbonated or polycarbonate salts, organic solvents miscible with phenolic resin, melamine resin (MUF) or PRF with a chain of no more than 6 carbons.

The resins described above are reacted with a catalyst, depending on the type of resin to be used.

The catalysts are chosen taking into consideration the type of resin, so acidic, basic or cross-linking agent-based catalysts can be used to generate a material suitable for use as a plug.

Acidic catalysts may be selected from (but not limited to) mineral acids such as sulfuric acid, hydrochloric acid, nitric acid, phosphoric acid, or mixtures thereof. Catalysts may also be selected from organic acids such as formic acid, lactic acid, benzenesulfonic acid derivatives, citric acid, acetic acid, or mixtures thereof. As mentioned, acids can be used in mixtures in proportions suitable for the setting reaction of the resin to be used.

Basic catalysts may be selected from (but not limited to) mineral bases such as potassium hydroxide, barium hydroxide, sodium hydroxide, calcium hydroxide, or mixtures thereof. Catalysts may also be chosen from organic bases such as diethylamine, triethylamine, ethanolamine, or mixtures thereof. As mentioned, bases can be used in mixtures in proportions suitable for the setting reaction of the resin to be used.

Catalysts based on cross-linking or hardening agents may be selected from (but not limited to) pMDI, erythritol and its derivatives, polyols, acrylic resins, polyvinyl alcohols, formaldehyde, succinic derivatives, alkaline formaldehydes such as Resorplus®, glycidol and epoxides derivatives or mixtures thereof or any bi or multi-functional compound capable of hardening the aforementioned resin. Each of these components or their mixtures can be used synergistically with one or more of the acidic or basic catalysts mentioned in the previous paragraphs.

Catalysts may consist of one or more of the agents mentioned above.

The weight/weight ratio of the bi-component mixture of resin respect to the catalyst (resin/catalyst) is in the range of 9:1 to 1:9; preferably between 3:1 and 1:3. Depending on the type of system and catalyst used, it can even be 2:1 to 1:2, in such a way as to generate a rigid foam material with hardness between 1 to 10 N/mm$^2$.

In particular, the bi-component composition or mixture of the present invention is constituted by a phenol-formaldehyde (PF) resin or a melamine-urea-formaldehyde (MUF) resin, in a proportion of the resin components of 50±20% by weight, which means a proportion of 30 to 70% of one component and 70 to 30% of the other resin component. This resin mixture is reacted in situ, that is, in the same blast hole with the catalyst, preferably in a proportion of 50±20% based on the weight of the total mixture, and additives in the required proportions.

EXAMPLES

Example 1

Laboratory-scale plugs were constructed in order to demonstrate the physicochemical and mechanical properties of the bi-component mixture of resin and catalyst of the present invention compared to plugs produced with components used in the state of the art. Plugs formed with the following resins were tested:

PF: Phenol formaldehyde resin, in molar ratio 1.6 (invention).

PUR: Polyurethane resin (comparative);

pMDI: Polymethyldiisocyanate (Durapro®) (comparative);

pMDI-LS: Polymethyldiisocyanate with low reactivity (Durapro®) (comparative);

PRF: Formaldehyde Resin/(Resorcinol+Phenol) in a molar ratio of 0.8 to 1.0 (invention);

MUF-1: Formaldehyde Resin/(Melamine+Urea) in a molar ratio of 1.2 to 1.8 (low viscosity) (invention);

MUF-2: Formaldehyde Resin/(Melamine+Urea) in a molar ratio of 1.2 to 1.8 (high viscosity) (invention);

Table No. 1 describes the bi-component mixtures of resin-catalyst of the present invention and foams produced with commercial resins as a comparison, and Table 2 shows the compositions of the catalysts used.

TABLE 1

Composition of foams produced with resins and catalysts according to the present invention compared to other commercial foams.

| | Bi-component mixture of resin | | | | | | |
|---|---|---|---|---|---|---|---|
| | PF | PRF | MUF-1 | MUF-2 | PUR | pMDI | pMDI-LS |
| Catalyst | D | E | D | D | A | B | C |
| Catalyst/ Resin Ratio | 2:1 | 2.3:1 | 1:1 | 1:1 | 1:1 | 1:1 | 1:1 |

TABLE 2

Catalysts used for the formation of the bi-component mixture of Table 1.

| Catalyst | A | B | C | D | E |
|---|---|---|---|---|---|
| Polyethylene glycol 400 | 94.79 | 90 | 87.5 | 0 | |
| Linear sulfonic acid | 0.47 | 2.5 | 2.5 | 0 | |
| Triethanolamine 75% | 4.74 | 7.5 | 7.5 | 0 | |
| Na—K lignosulfonate | 0 | 0 | 5.5 | 0 | |
| p-toluenesulfonic acid | 0 | 0 | 0 | 50 | |
| Sulfuric acid | 0 | 0 | 0 | 25 | |
| RESORPLUS ® | | | | | 30 |
| Water | 0 | 0 | 0 | 25 | |
| TOTAL | 100 | 100 | 100 | 100 | |

Tests were carried out in transparent polycarbonate tubes of 40 cm long and 10 cm in diameter. These tubes were filled with gravel to a height of 22 cm, and 300 g of resin-catalyst mixture was poured over the gravel, as shown in FIG. 1.

Measurements were taken to record the degree of diffusion of the bi-component mixture within the gravel, setting time, degree of expansion and the maximum temperature reached by the mixture at the surface and bottom.

Table No 3 shows a summary of the average results obtained from the various laboratory tests. The numbering 1 to 7 of the columns correlates with the numbering of the photograph in FIG. 1.

TABLE NO. 3

Summary of the results obtained from the laboratory tests.

| Bicomponent resin-catalyst mixture | Diffusion in gravel (cm) | Equivalent diffusion (m) | Expansion (cm) | Volume change (%) | Setting time (min) | Maximum temperature (° C.) |
|---|---|---|---|---|---|---|
| (1) PF Invention | 8 | 1.46 | 10 | 500 | 2 | 40 |
| (2) PUR | 10.5 | 1.91 | 10.5 | 300 | 20 | 56 |
| (3) pMDI | Total | 4 | 14.5 | 500 | 15 | 115 |
| (4) pMDI-LS | 12 | 2.18 | >20 | 800 | 15 | 95 |
| (5) PRF Invention | 4 | 0.73 | 6.5 | 300 | 2 | 40 |
| (6) MUF-1 Invention | 3.5 | 0.64 | 10 | 500 | 2 | 35 |
| (7) MUF-2 Invention | 1.5 | 0.28 | 10 | 500 | 2 | 55 |

As it can be seen from the results shown in Table 3, the expansion and volume change parameters of the resins formed allow establishing a control for the formation of the plug, in order to extrapolate it to a blast hole and not exceed the volume limits that the hole can contain when forming the plug.

It is also possible to appreciate that the setting time of the bi-component mixture of the present invention represents a considerably shorter time than the formation of rigid foams formed with the other resins tested.

Figure 2:
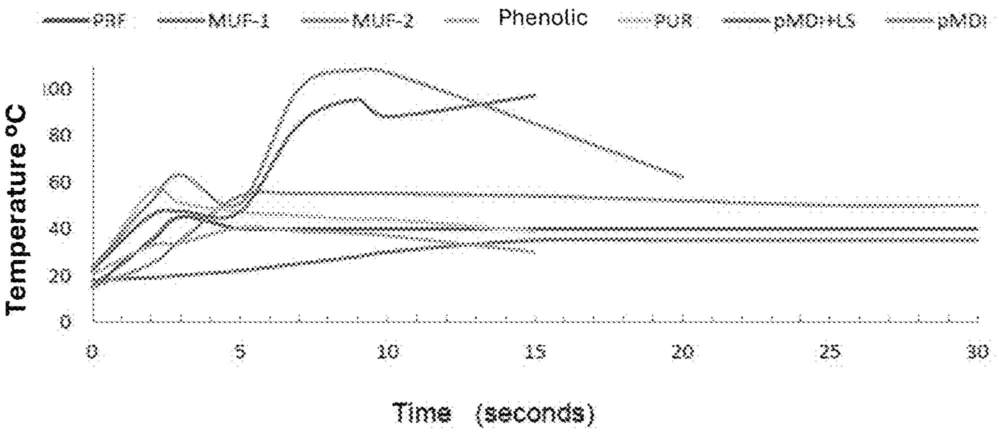
FIG. 2: Evolution of surface temperature as a function of time measured in the formation of rigid foam of PHENOLIC Resin: PF phenol formaldehyde, in molar ratio 1.6; PUR: Pylourethane Resin; pMDI: Polymethyldiisocyanate (Durapro®); pMDI-LS: Low reactivity polymethyldiisocyanate (Durapro®); PRF: Formaldehyde Resin/(Resorcinol+Phenol) in a molar ratio of 0.8 to 1.0; MUF-1: Formaldehyde Resin/(Melanin+Urea) in a molar ratio of 1.2 to 1.8 (low viscosity); MUF-2: Formaldehyde Resin/(Melanin+Urea) in a molar ratio of 1.2 to 1.8 (high viscosity).

When reacting the resins and catalysts for the formation of the plug, the evolution of temperature as a function of time was measured, as shown in FIG. 2, where it was found that the bottom temperatures remained constant except for the pMDI mixture (comparative), which reached more than 100° C. Therefore, it is possible to establish that the compositions of the present invention have the advantage of maintaining a temperature equal to or lower than 40° C., which gives an advantage in the detonation operation, since the detonation wires have limits and safety standards which cannot operate at temperatures higher than 55°, since above this temperature the wires can present failures, which can inhibit a correct detonation, with all the problems associated with the so-called “misfire”, which implies risk situations in the mine due to latent explosives. Therefore, exothermic temperatures below 40° Celsius is a highly desirable condition.

Example 2

The physicochemical properties of the experimental formulas were optimized at the laboratory scale of Example 1, in order to generate stable compounds to be used in field blasting with explosive material, to verify the feasibility and possible scalability of the prototype.

A test of the invention was carried out to evaluate the method of forming a blasting plug based on a formaldehyde resin and a catalyst of the invention, which when applied in-situ, i.e. in the field, react and generate the rigid foam. The test included a comparison with conventional plugs.

The mixture of formaldehyde resin-catalyst is loaded directly into the holes in the required amount, according to the diameter and depth of the hole, that is, in the order of 2 to 100 kg, considering an expansion volume of 3 to 5 times the loaded volume of the mixture. The time it takes to load the hole is around 30 seconds to 5 minutes, depending on the loading volume, and the foaming formation time is in the order of 3 to 10 minutes, also depending on the loading volume.

For the field example, holes with plugs based on the bi-component mixture of phenolic resin-catalyst of the present invention and conventional holes with drill cuttings were considered. Drill cuttings refers to the ground material obtained from drilling the ore during hole construction, used as the sole constituent for a conventional plug. The holes with plugs of the present invention have drill cuttings at a proportionally minimum fraction in their design.

The perforation design, load configuration and detonation were kept constant. Table 4 shows the drilling and blasting design parameters for the blast holes.

TABLE 4

Drilling and blasting design parameters

| Parameters | Values |
|---|---|
| Type of Explosive | ANFO |
| Diameter | 11.5 cm (4.5 inches) |
| Blasting cap | 0.5 meters |
| Charge length | 5.5 meters |
| Plug length | 2 meters |
| Density explosive | 0.8 g/cm$^3$ |
| Linear charge | 8.21 kg/m |
| Explosive column charge | 28.7 kg |
| Load factor | 199 g/ton |
| Length of conventional drill cutting plug | 2.0 meters |
| Length of drill cutting of invention | 0.5 meters (maximum) |
| Length of plug of resin mix of invention | 1.5 meters (minimum) |

Figure 3:
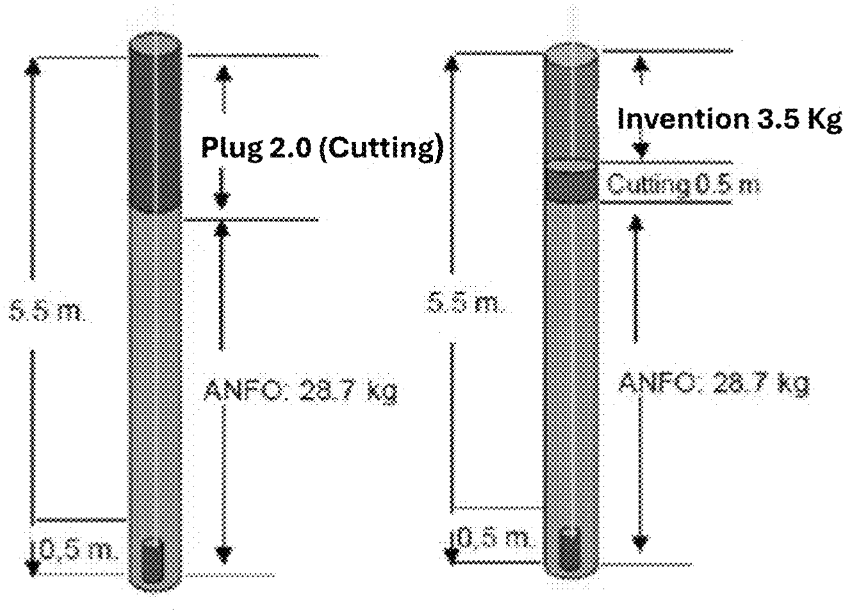
FIG. 3: represents a diagram of the configuration and design of the blast holes compared to a conventional plug scheme according to the parameters in Table 3.

FIG. 3 represents a scheme of the configuration and design of the blasting holes according to the parameters defined in the previous table.

Figure 4:
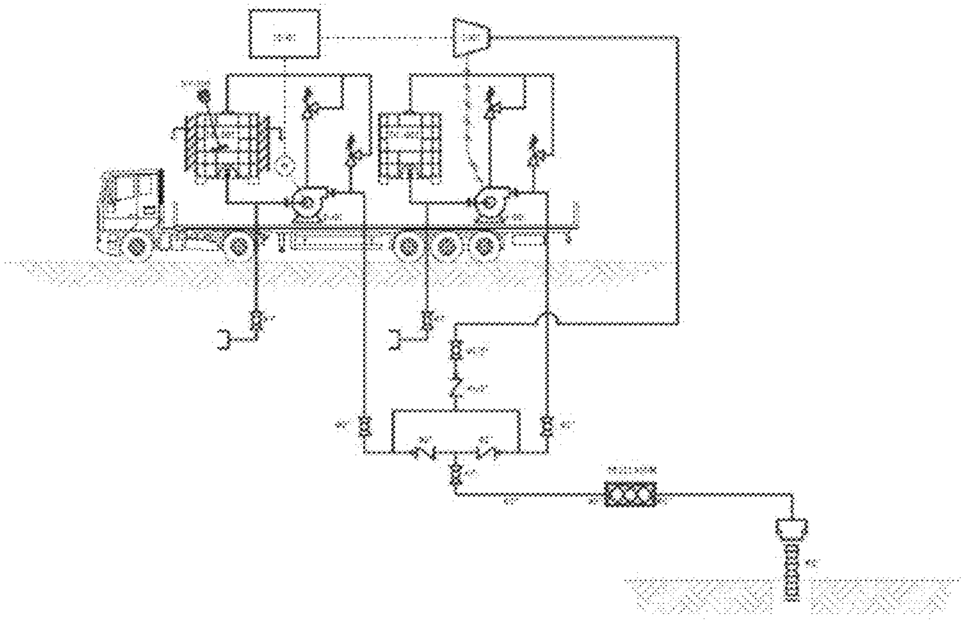
FIG. 4: Flowchart of blast hole loading with the resin-catalyst mixture of the present invention.

FIG. 4 shows a flow chart of the preferred embodiment of the method of applying the bi-component mixture of resin-catalyst of the present invention, which is mounted on a truck to provide mobility to the system.

The application system comprises a first pond containing the resin and a second pond containing the catalyst. In the preferred embodiment, the ponds have a volume of approximately 1 m$^3$.

A first flow originates from the first pond to a first pump. The first pump can be a screw or centrifugal pump, being driven, for example, by a motor powered by a generator. The first pond may also comprise an internal mechanical agitator, for homogenization and recirculation of the resin, and may also include a heater to maintain the necessary temperature in low ambient temperature conditions. Alternatively, the second pond may also include such features (not shown in FIG. 4).

A second flow originates from the second pond, by means of a second pump. The second pump can be a pneumatic pump, driven, for example, by a compressor that is also powered by the generator.

Both flows are standardized to a predetermined ratio (resin to catalyst) ranging from 3:1 to 1:3.

As shown in FIG. 4, the first flow and the second flow are directed through various valves to a mixer, for example, a static mixer, achieving homogenization of the catalyst and resin. Once the mixture has been mixed, it is deposited directly into the blast hole.

FIG. 4 also shows that the preferred embodiment of the application method has various valves, which open or close the passage of flows. Both the first and second flow can be redirected to their corresponding ponds by means of, for example, relief valves in case the pressures are high enough and/or the other valves are closed.

The compressor is additionally used to provide an air flow when stopping the system or terminating the application of the mixture. This air flow allows the cleaning of pipes, and particularly to avoid the deposition of residues of the homogenized and solidified mixture in the static mixer.

The first and second flows and air flow can be regulated manually, by reading of various mass flow meters, or automatically, by means of a programmable logic controller (PLC).

The amount of resin-catalyst mixture to be loaded into the blast holes is calculated according to the diameter and height of the hole, considering an expansion of 3 to 5 times the foam formation volume. The loading time of a hole is approximately 30 seconds to 1 minute and with a foaming time of the order of 40 to 60 seconds.

The mixer used in the test corresponds to a static mixer of 30 cm long, 1 inch wide (2.54 cm) with a flow rate design ranging from 1 to 200 L/minute.

The procedure for carrying out the formation of the plug and subsequent detonation and blasting with the rigid foam of the present invention comprises the following steps:

load the explosive to the bottom of each of the holes, 28.7 Kg of ANFO (Ammonium Nitrate Fuel Oil), load with a layer of drill cutting or stone (1-2 kg of material equivalent to 0.5 m) to seal and prevent contact of the foam of the invention with the explosive, load 3.5 kg of the invention foam according to the method described above, in a time of 30 seconds to 1 minute, setting of the foam of the invention, which lasts between 1 to 3 minutes.

once the hole filling operation is completed, the area is evacuated and the holes are detonated.

For comparison, conventional holes were loaded with 2 meters of drill cuttings, without the foam of the present invention. The loading time of these conventional holes was on average 5 minutes.

After detonation, air pressure measurements and aerial camera inspections are carried out to determine dust emissions and the height of smoke columns.

The total reaction time of setting for the rigid foam of the present invention ranged from 1 to 3 minutes, that is, the time in which the rigid foam reached the final hardness. The reaction therefore reaches its end very quickly, which provides a highly efficient performance in the loading of plug and explosives in the blasting area.

The density of the foam obtained was of the order of 0.25 g/m and its stiffness was of the order of 2 $N/mm^2$. These values obtained from the foam improved the performance of the blasting, allowing for a greater amount of noise and energy expansion to be retained at the time of detonation, and also allowing for greater rock fragmentation, compared to traditional holes.

Figure 5:
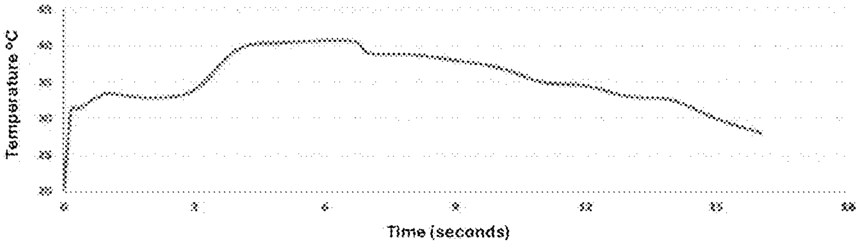
FIG. 5: Graph of surface exothermicity during foaming of the present invention, measured over time (seconds), at room temperature of 20° C.

The test carried out in the field showed a maximum exothermicity at 6.5 seconds, with the maximum temperature reached on the surface of the foam being 40.6° C., as shown in FIG. 5, providing safety and the advantage of keeping the wires in good condition and not being damaged by the effect of temperature.

By using slow motion recording images, at a speed of 240 frames per second, it was possible to obtain the retention time and ejection height of the detonation. Retention time is also known as explosive velocity, and corresponds to the speed at which the shock wave front travels through a detonating explosive.

The recording images demonstrated that the test conducted in the field allowed containment of gases in the blast holes with plugs formed with the phenolic resin of the present invention, with an ejection delay of 50 milliseconds with respect to the detonation initiation point marked by an electronic system in the conventional hole without foam, and a decrease in the height of the ejection from 15 meters height for the conventional plugs compared to 5 meters height for plugs of the invention.

Figure 6:
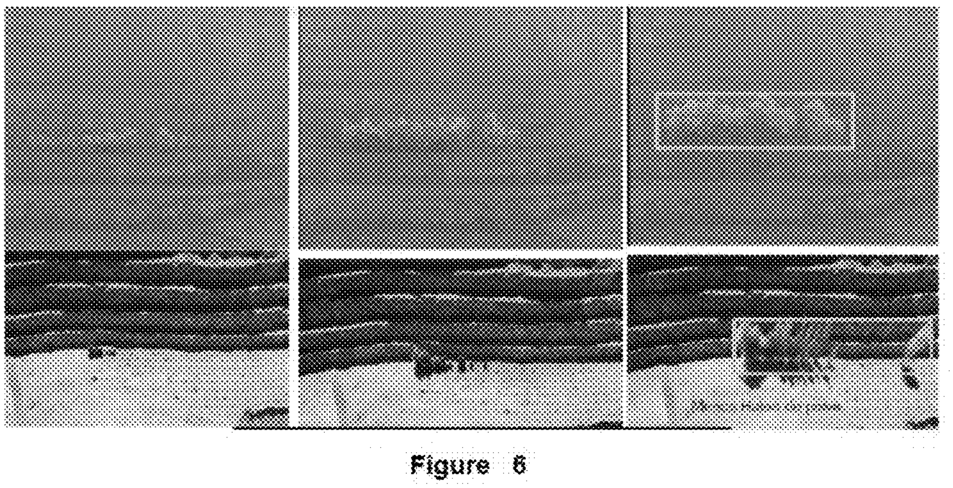
FIG. 6: Photographic sequences of blasting at time 0, 30 and 50 milliseconds. Top: conventional blasting with debris plugs; Bottom: blasting with phenolic resin plugs of the present invention.

FIG. 6 shows photographs that were taken at the same comparative times when making a blasting with and without plugs of the invention. Both the upper (conventional blasting) and lower (blasting with the resin plug of the present invention) photographs were captured with a drone during the operation at times 0, 30 and 50 milliseconds.

In addition to the height measured in both cases, at the time of blasting, the density of smoke and dust is clearly observed in the upper photographs, compared to the lower photographs, where a lower density of smoke can be seen and there are even sectors of the blasting where there is no dust ejection from the blast holes.

On the other hand, the blasting with the invention's plugs produced a blast zone with greater fragmentation, compared to a conventional blasting plug, where the percentages of rock size decrease ranged between 30-50% with respect to conventional blasting.

The reduction in air pressure was also measured, which is mathematically correlated by software with the sound intensity during blasting, resulting in a reduction of between 50 and 90% of decibels with respect to conventional blasting.

To determine the behavior of the explosives and the decibel measurement, two conventional blasts were considered, with the same configuration of blast hole designs defined in this example. Likewise, 3 blasting operations were carried out with the invention's plugs, under the same conditions to compare with the noise behavior of conventional plugs. Table No 5 provides a summary of the measurements taken.

TABLE 5

Field measurements for determination of noise reduction in blasting with plugs loaded with the bi-component mixture of the present invention (PF + catalyst) in comparison with plugs loaded with drill cuttings in conventional blasting.

| Blasting type | Number of holes | Pressure (Pa) | Sound intensity | Noise reduction |
|---|---|---|---|---|
| Conventional 1 | 24 | 4.79 | 107.7 | 0% |
| Convenctional 2 | 20 | 6.28 | 110.1 | 0% |
| Invention 1 | 30 | 1.18 | 102.2 | 79% |
| Invenction 2 | 16 | 0.53 | 98.3 | 90% |
| Invention 3 | 30 | 2.47 | 104.9 | 55% |

The invention claimed is:

1. A method for forming in situ mining blast hole plugs comprising:

loading a blast hole with a bi-component mixture of formaldehyde-based resin-catalyst on an explosive separated by a layer of drill cutting, where the loading order is as follows; first, the explosive is loaded at the bottom of the blast hole. then the layer of drill cutting is loaded in a minimum quantity that does not exceed 50 cm in height, and finally the bi-component mixture of formaldehyde-based resin-catalyst is loaded, where the bi-component mixture is produced in situ in the hole forming a foam, where the formaldehyde-based resin contained in a first pond is selected from phenol-formaldehyde (PF) resins, urea-formaldehyde (UF) resins, melamine-formaldehyde (MF) resins, melamine-urea-formaldehyde (MUF) resins, phenol-resorcinol-formaldehyde (PRF) resins, and modified formaldehyde-based resins with lignin or tannins; and the catalyst contained in a second pond is selected from acidic catalysts, basic catalysts, or based-en-cross-linking agent catalysts;

allowing the foam to set, forming a rigid foam with a density between about 0.2 and about 0.3 $Kg/m^3$ and in which the reaction temperature is less than about 55° C., generating an expansion volume of about 3 to 5 times a loaded volume of the bi-component mixture;

after the bi-component mixture has set, initiating detonation.

2. The method for forming blast hole plugs according to claim 1, wherein the catalyst is an acidic catalyst selected from mineral acids, sulfuric acid, hydrochloric acid, nitric acid, phosphoric acid, and mixtures thereof, and/or organic acids, formic acid, lactic acid, benzenesulfonic acid derivatives, citric acid, acetic acid, and mixtures thereof.

3. The method for forming blast hole plugs according to claim 2, wherein the catalyst is a basic catalyst selected from mineral bases, potassium hydroxide, barium hydroxide, sodium hydroxide, calcium hydroxide, and mixtures thereof and/or organic bases, diethylamine, triethylamine, ethanolamine and mixtures thereof.

4. The method for forming blast hole plugs according to claim 2, wherein the catalyst is based on cross-linking or hardening agents and is selected from Polymethyldiisocyanate (pMDI), erythritol and its derivatives, polyols, acrylic resins, polyvinyl alcohols, formaldehyde, succinic derivatives, alkaline formaldehydes, glycidol and epoxide derivatives, and mixtures thereof.

5. The method for forming blast hole plugs according to claim 1, wherein the weight proportion between resin and catalyst is in a range of about 9:1 to about 1:9.

6. The method for forming blast hole plugs according to claim 1 further comprising optionally applying rheological modifiers, surfactants, buffers or pH regulators, gasifying agents, expanding agents and mixtures thereof.

7. A system for forming mining blast hole plugs to carry out the method of claim 1, wherein the system allows in-situ formation of rigid foam blocks using a bi-component mixture of resin-catalyst, comprising:

a first pond containing a formaldehyde-based resin, selected from phenol-formaldehyde (PF) resins, urea-formaldehyde (UF) resins, melamine-formaldehyde (MF) resins, melamine urea formaldehyde (MUF) resins, phenol-resorcinol formaldehyde (PRF) resins, modified formaldehyde-based resins with lignin or tannins, and their derivatives;

a second pond containing a catalyst selected from acidic, basic, or based on cross-linking agent catalysts;

a mixer-applicator for homogenization and application of the bi-component mixture;

pumps and valves configured to allow loading the plug into the blast hole; and a monitoring system.

8. A mixture to be used in situ as a blasting plug in mining blastholes forming a rigid foam according to the method of claim 1, comprising a bi-component mixture of resin-catalyst where the resin is formaldehyde-based and is selected from phenol-formaldehyde (PF) resins, urea-formaldehyde (UF) resins, melamine-formaldehyde (MF) resins, melamine urea formaldehyde (MUF) resins, phenol-resorcinol formaldehyde (PRF) resins, modified formaldehyde-based resins with lignin or tannins, and their derivatives, and the catalyst is selected from acidic, basic, or based on cross-linking agent catalysts; where a rigid foam formed with the bi-component mixture has a density between about 0.2 and about 0.3 $Kg/m^3$ and in which the reaction temperature is less than about 55° C., generating an expansion volume of about 3 to about 5 times a loaded volume of the bi-component mixture.

9. The mixture according to claim 8, wherein the catalyst is an acidic catalyst selected from mineral acids, sulfuric acid, hydrochloric acid, nitric acid, phosphoric acid, or mixtures thereof, and/or organic acids, formic acid, lactic acid, benzenesulfonic acid derivatives, citric acid, acetic acid, and mixtures thereof.

10. The mixture according to claim 8, wherein the catalyst is a basic catalyst selected from mineral bases, potassium hydroxide, barium hydroxide, sodium hydroxide, calcium hydroxide, or mixtures thereof and/or organic bases, diethylamine, triethylamine, ethanolamine, and mixtures thereof.

11. The mixture according to claim 8, wherein the catalyst is based on crosslinking or hardening agents and is selected from Polymethyldiisocyanate (pMDI), erythritol and its derivatives, polyols, acrylic resins, polyvinyl alcohols, formaldehyde, succinic derivatives, alkaline formaldehydes, glycidol and epoxides derivatives, and mixtures thereof.

12. The mixture according to claim 8, wherein the weight proportion between resin and catalyst is in the range of about 9:1 to about 1:9.

13. The mixture according to claim 8, wherein the mixture further comprises rheological modifiers, surfactants, buffers or pH regulators, gasifying agents, expanding agents, and mixtures thereof.

14. Use of a bi-component mixture of resin-catalyst according to claim 8, wherein it is to form a blasting plug in mining blastholes to reduce the loading time of a plug, increase rock fragmentation, reduce the noise of blasting, or contain particulate material produced by the blasting.

15. The method for loading and blasting a mining blasthole comprising the use of the mixture of claim 11, and comprising the following steps:

installing an explosive in a blast hole, adding a layer of drill cutting over the explosive, loading a bi-component mixture of resin-catalyst to form a foam in situ, onto the drill cutting layer, where the resin is formaldehyde-based and is selected from phenol-formaldehyde (PF) resins, urea-formaldehyde (UF) resins, melamine-formaldehyde (MF) resins, melamine urea formaldehyde (MUF) resins, phenol-resorcinol formaldehyde (PRF) resins, modified formaldehyde-based resins with lignin or tannins, and their derivatives, and the catalyst is selected from acidic, basic, or based on cross-linking agent catalysts;

allowing the foam formed to set, obtaining the blasting plug by a rigid foam formed in situ wherein the rigid foam has a density between about 0.2 and about 0.3 $Kg/m^3$ and in which the reaction temperature is less than about 55° C., generating an expansion volume of about 3 to about 5 times a loaded volume of the bi-component mixture, and blasting the explosive, where the drill cutting layer acts as a separation medium between the explosive and the bi-component mixture, preventing the mixture from diffusing into the explosive.

* * * * *